US011214160B2

(12) United States Patent
Mandel-Senft et al.

(10) Patent No.: US 11,214,160 B2
(45) Date of Patent: Jan. 4, 2022

(54) SYSTEM FOR AUTOMATED CHARGING OF AUTONOMOUS VEHICLES

(71) Applicant: GM Cruise Holdings LLC, San Francisco, CA (US)

(72) Inventors: Adam Mandel-Senft, Phoenix, AZ (US); Michael Frank Schmidt, Scottsdale, AZ (US); Robert Tweedy, Phoenix, AZ (US); Kyle Vogt, San Francisco, CA (US); Divya Thakur, San Francisco, CA (US)

(73) Assignee: GM Cruise Holdings LLC, San Francisco, CA (US)

(*) Notice: Subject to any disclaimer, the term of this patent is extended or adjusted under 35 U.S.C. 154(b) by 0 days.

(21) Appl. No.: 16/809,821

(22) Filed: Mar. 5, 2020

(65) Prior Publication Data
US 2021/0276433 A1    Sep. 9, 2021

(51) Int. Cl.
| | | |
|---|---|---|
| *B60L 53/00* | (2019.01) | |
| *B60L 53/35* | (2019.01) | |
| *B60L 53/10* | (2019.01) | |
| *B60L 53/16* | (2019.01) | |
| *B60L 53/68* | (2019.01) | |
| *B60L 53/53* | (2019.01) | |
| *B60L 53/30* | (2019.01) | |

(52) U.S. Cl.
CPC .............. *B60L 53/35* (2019.02); *B60L 53/11* (2019.02); *B60L 53/16* (2019.02); *B60L 53/305* (2019.02); *B60L 53/53* (2019.02); *B60L 53/68* (2019.02)

(58) Field of Classification Search
CPC ........ B60L 53/11; B60L 53/305; B60L 53/68; B60L 53/16; B60L 53/53; B60L 53/35
See application file for complete search history.

(56) References Cited

U.S. PATENT DOCUMENTS

| | | | | |
|---|---|---|---|---|
| 3,999,372 A * | 12/1976 | Welch | ................... | G07F 17/246 368/6 |
| 4,500,977 A * | 2/1985 | Gelhard | .................. | G01S 15/18 367/108 |
| 5,125,741 A * | 6/1992 | Okada | ................ | G01N 21/8901 356/237.2 |
| 5,306,999 A * | 4/1994 | Hoffman | ................. | B60L 53/31 320/109 |
| 5,461,298 A * | 10/1995 | Lara | ....................... | H01M 10/44 320/109 |
| 6,157,162 A * | 12/2000 | Hayashi | .................. | H02J 50/90 320/104 |
| 6,795,031 B1 * | 9/2004 | Walker | ..................... | H01Q 3/04 343/713 |

(Continued)

*Primary Examiner* — Naum Levin
(74) *Attorney, Agent, or Firm* — Patent Capital Group

(57) ABSTRACT

The present disclosure provides a method comprising, subsequent to arrival of a vehicle at a charging station, establishing communications between a vehicle side autonomous charging system associated with the vehicle and a charging station side autonomous charging system associated with the charging station; receiving by the charging station side autonomous charging system at least one signal from the vehicle side autonomous charging system, wherein the at least one signal is indicative of a location of a charging port of the vehicle; and using the received at least one signal to guide a robotic extension arm of the charging station to a location proximate the vehicle charging port.

19 Claims, 8 Drawing Sheets

(56) References Cited

U.S. PATENT DOCUMENTS

| | | | | |
|---|---|---|---|---|
| 6,820,897 B2* | 11/2004 | Breed | B60R 21/015 | 280/735 |
| 7,109,938 B2* | 9/2006 | Franson | G01S 7/032 | 343/767 |
| 7,289,014 B2* | 10/2007 | Mullet | E05F 15/668 | 340/5.7 |
| 7,421,321 B2* | 9/2008 | Breed | B60C 11/24 | 340/442 |
| 8,279,124 B1* | 10/2012 | Jones | H01Q 1/3275 | 343/713 |
| 8,853,999 B2* | 10/2014 | Haddad | B60L 53/35 | 320/109 |
| 9,169,114 B2* | 10/2015 | Butler, Jr. | G07F 13/025 | |
| 9,766,122 B2* | 9/2017 | Cothuru | B64C 19/00 | |
| 9,862,280 B2* | 1/2018 | McNally | B60L 53/37 | |
| 9,873,347 B2* | 1/2018 | Brown | B60L 11/1833 | |
| 10,052,962 B2* | 8/2018 | Dunger | H01R 24/00 | |
| 10,093,189 B2* | 10/2018 | Sommarstrom | B25J 9/009 | |
| 10,109,451 B2* | 10/2018 | Jost | H01J 37/026 | |
| 10,286,793 B2* | 5/2019 | Paryani | B60L 53/16 | |
| 10,676,022 B2* | 6/2020 | Zevenbergen | G01C 21/3461 | |
| 10,685,455 B2* | 6/2020 | Sinha | G06K 9/6202 | |
| 2005/0286479 A1* | 12/2005 | Spencer | H04B 7/2606 | 370/338 |
| 2010/0201309 A1* | 8/2010 | Meek | B60L 53/14 | 320/108 |
| 2010/0228517 A1* | 9/2010 | Wike, Jr. | G01S 7/4813 | 702/149 |
| 2011/0082612 A1* | 4/2011 | Ichikawa | B60L 53/126 | 701/22 |
| 2011/0254504 A1* | 10/2011 | Haddad | B60L 53/65 | 320/109 |
| 2012/0286730 A1* | 11/2012 | Bonny | B60L 53/35 | 320/109 |
| 2013/0076902 A1* | 3/2013 | Gao | B60L 53/35 | 348/148 |
| 2013/0250040 A1* | 9/2013 | Vitsnudel | H04N 13/373 | 348/36 |
| 2013/0338820 A1* | 12/2013 | Corbett | B60L 53/35 | 700/232 |
| 2014/0067660 A1* | 3/2014 | Cornish | G06Q 20/145 | 705/39 |
| 2016/0195856 A1* | 7/2016 | Spero | G06N 5/046 | 700/90 |
| 2016/0339791 A1* | 11/2016 | Sim | H02J 50/90 | |
| 2016/0352113 A1* | 12/2016 | Zhao | B60L 53/35 | |
| 2017/0225578 A1* | 8/2017 | Paryani | B60L 53/11 | |
| 2017/0315557 A1* | 11/2017 | Vogt | B60L 58/12 | |
| 2017/0349055 A1* | 12/2017 | Kilic | B60L 53/16 | |
| 2018/0222337 A1* | 8/2018 | Cook | B60L 11/1818 | |
| 2019/0275907 A1* | 9/2019 | Lee | B60L 53/35 | |
| 2020/0189413 A1* | 6/2020 | Fagan | H01R 13/631 | |
| 2020/0294401 A1* | 9/2020 | Kerecsen | G05D 1/0287 | |
| 2020/0361331 A1* | 11/2020 | Shin | B60L 53/37 | |
| 2021/0001736 A1* | 1/2021 | Schoob | B60L 53/37 | |
| 2021/0114476 A1* | 4/2021 | Spaninks | B60L 53/14 | |

* cited by examiner

SYSTEM FOR AUTOMATED CHARGING OF AUTONOMOUS VEHICLES

TECHNICAL FIELD OF THE DISCLOSURE

The present disclosure relates generally to autonomous vehicles (AVs) and, more specifically, to systems and methods for automated charging of such vehicles.

BACKGROUND

An autonomous vehicle is a vehicle that is capable of sensing and navigating its environment with little or no user input. An autonomous vehicle may sense its environment using sensing devices such as Radio Detection and Ranging (RADAR), Light Detection and Ranging (LIDAR), image sensors, cameras, and the like. An autonomous vehicle system may also use information from a global positioning system (GPS), navigation systems, vehicle-to-vehicle communication, vehicle-to-infrastructure technology, and/or drive-by-wire systems to navigate the vehicle. As used herein, the phrase "autonomous vehicle" includes both fully autonomous and semi-autonomous vehicles.

Many autonomous vehicles are electric or hybrid electric vehicles that include at least one Rechargeable Energy Storage System (RESS), or battery. After extended use of the electric or hybrid electric vehicle, the state of charge of the battery may become low and need to be recharged; accordingly, it is desirable to provide systems and methods that assist in the automatic charging of the battery. Furthermore, other desirable features and characteristics of the present invention will become apparent from the subsequent detailed description and the appended claims, taken in conjunction with the accompanying drawings and the foregoing technical field and background.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Figure 1:
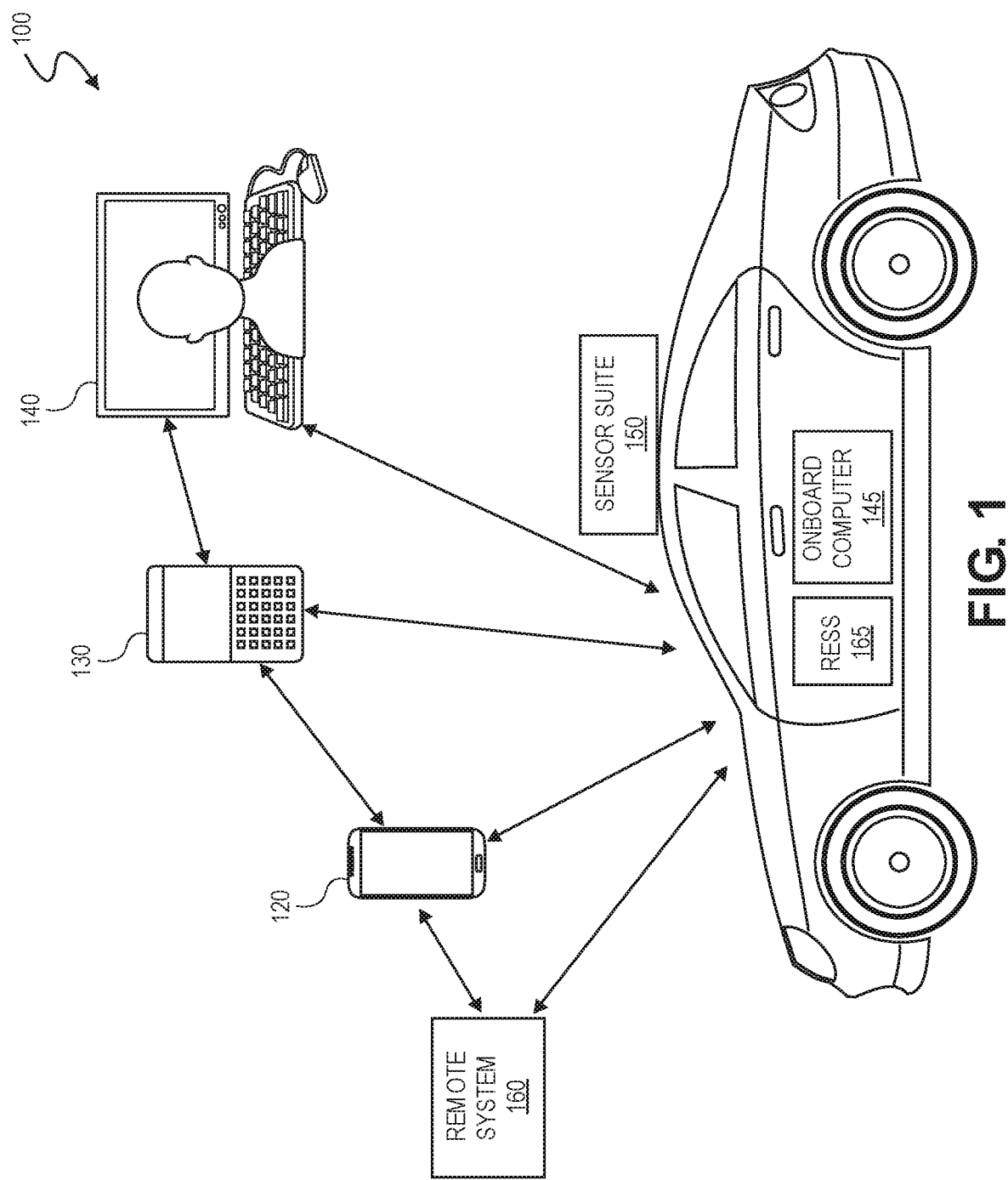
FIG. 1 is a block diagram illustrating an example autonomous vehicle in connection with which a system for automated charging of an autonomous vehicle according to some embodiments of the present disclosure may be implemented.

The systems, methods and devices of this disclosure each have several innovative aspects, no single one of which is solely responsible for the all of the desirable attributes disclosed herein. Details of one or more implementations of the subject matter described in this specification are set forth in the description below and the accompanying drawings.

Embodiments of the present disclosure provide a method comprising, subsequent to arrival of a vehicle at a charging station, establishing communications between a vehicle side autonomous charging system associated with the vehicle and a charging station side autonomous charging system associated with the charging station; receiving by the charging station side autonomous charging system at least one signal from the vehicle side autonomous charging system, wherein the at least one signal is indicative of a location of a charging port of the vehicle; and using the received at least one signal to guide a robotic extension arm of the charging station to a location proximate the vehicle charging port.

Embodiments of the present disclosure further provide a system for autonomously charging a vehicle at a charging station. The system includes a vehicle side module associated with a charging port of the vehicle and a charging station side module associated with a robotic extension arm of the charging station and comprising electronics for receiving signals from the vehicle side module indicative of a location of the charging port. The received signals are used by the charging station side module to guide the robotic extension arm to the charging port and include at least one of ultra-sonic signals, radio signals, visible light signals and infrared ("IR") signals.

Embodiments of the present disclosure may still further provide a charging station comprising a robotic extension arm carrying a charging connector connected to a power source by an extension cord; a charging slot for receiving a vehicle having a battery, wherein the charging connector is coupled to a charging port of the vehicle to charge the battery; and a charging station side module associated with the robotic extension arm for receiving signals from a vehicle side module associated with the charging port, the received signals used to guide the robotic extension arm to a location of the charging port, the robotic extension arm for exposing the charging port and coupling the charging connector thereto. The received signals include at least one of ultra-sonic signals, radio signals, visible light signals and infrared ("IR") signals.

As will be appreciated by one skilled in the art, aspects of the present disclosure, in particular aspects of an automated charging system for an autonomous vehicle, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g. to the existing system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings in which like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the following description and the claims.

One embodiment is a system for providing non-vision-based signal support for automated charging of autonomous vehicles. In particular, the signal support assists an automated charging system in locating a charging port door, or cover, and a charging port of the autonomous vehicle. In certain embodiments, the system uses a system similar to an Instrument Landing System ("ILS"), which uses narrow intersecting radio beams to communicate the location of an object (e.g., an aircraft) relative to a target (e.g., a point on a runway). In certain example implementations, a transmitter and a receiver are incorporated into both a vehicle to be charged and a robotic charging, or extension, arm of a charging system, with communication between the two occurring through a backend system. In an alternative implementation, the vehicle transmitter/receiver is replaced with a reflector (e.g., a parabolic) antenna. In this implementation, the transmitter/receiver of the robotic extension arm transmits signals and adjusts the position of the arm until a reflected signal is received by the receiver. The degree of freedom required by the extension arm could be simplified by using the vehicle's forward and backward motion to properly align the vehicle between charging system positioning devices, such as a set of tracks or rails, defining a charging station slot.

As shown in FIG. 1, a system 100 for providing signal support for charging an autonomous vehicle according to some embodiments of the present disclosure may be implemented in connection with an autonomous vehicle 110 including a passenger interface 120, a vehicle coordinator 130, and/or a remote expert interface 140. In certain embodiments, the remote expert interface 140 allows a non-passenger entity to set and/or modify the behavior settings of the autonomous vehicle 110. The non-passenger entity may be different from the vehicle coordinator 130, which may be a server.

In addition, the autonomous vehicle 110 preferably includes an onboard computer 145, a sensor suite 150 (e.g., computer vision ("CV") system, LIDAR, RADAR, wheel speed sensors, GPS, cameras, etc.), and an RESS 155. The onboard computer 145 implements an autonomous driving system (ADS) for controlling the autonomous vehicle 110 and processing sensed data from the sensor suite 150 and/or other sensors in order to determine the state of the autonomous vehicle 110. Based upon the vehicle state and programmed instructions, the onboard computer 145 preferably modifies or controls driving behavior of the autonomous vehicle 110.

Driving behavior, or driving mode, may include any information relating to how an autonomous vehicle drives (e.g., actuates brakes, accelerator, steering), or a behavior of the autonomous vehicle given a set of instructions (e.g., a route or plan). Driving behavior may include a description of a controlled operation and movement of an autonomous vehicle and the manner in which the autonomous vehicle applies traffic rules during one or more driving sessions. Driving behavior may additionally or alternatively include any information about how an autonomous vehicle calculates routes (e.g., prioritizing fastest time vs. shortest distance), other autonomous vehicle actuation behavior (e.g., actuation of lights, windshield wipers, traction control settings, etc.) and/or how an autonomous vehicle responds to environmental stimulus (e.g., how an autonomous vehicle behaves if it is raining, or if an animal jumps in front of the vehicle). Some examples of elements that may contribute to driving behavior include acceleration constraints, deceleration constraints, speed constraints, steering constraints, suspension settings, routing preferences (e.g., scenic, faster routes, no highways), lighting preferences, action profiles (e.g., how a vehicle turns, changes lanes, or performs a driving maneuver), and action frequency constraints (e.g., how often a vehicle changes lanes).

The onboard computer 145 functions to control the operations and functionality of the autonomous vehicles 110 and processes sensed data from the sensor suite 150 and/or other sensors in order to determine states of the autonomous vehicles. Based upon the vehicle state and programmed instructions, the onboard computer 145 preferably modifies or controls behavior of autonomous vehicles 110. The onboard computer 145 is preferably a general-purpose computer adapted for I/O communication with vehicle control systems and sensor systems, but may additionally or alternatively be any suitable computing device. The onboard computer 145 is preferably connected to the Internet via a wireless connection (e.g., via a cellular data connection). Additionally or alternatively, the onboard computer 145 may be coupled to any number of wireless or wired communication systems.

The sensor suite 150 preferably includes localization and driving sensors; e.g., photodetectors, cameras, RADAR, Sound Navigation And Ranging (SONAR), LIDAR, Global Positioning System (GPS), inertial measurement units (IMUS), accelerometers, microphones, strain gauges, pressure monitors, barometers, thermometers, altimeters, etc.

A remote facility 160, which may comprise a central office or back office facility, may also be provided for providing the autonomous vehicle 110 (and particularly, onboard computer 145) with a number of different system backend functions. The remote facility 160 may include one or more switches, servers, databases, live advisors, and/or an automated voice response system ("VRS"). Remote facility 160 may include any or all of the aforementioned components, which may be coupled to one another via a wired or wireless local area network (LAN). Remote facility 160 may receive and transmit data via one or more appropriate devices and network from and to the autonomous vehicle 110, such as by wireless systems, such as 882.11x, GPRS, and the like. A database at the remote facility 160 can store account information such as subscriber authentication information, vehicle identifiers, profile records, behavioral patterns, and other pertinent subscriber information. The remote facility 160 may also include a database of roads, routes, locations, etc. permitted for use by autonomous vehicle 110. The remote facility 160 may communicate with the autonomous vehicle 110 to provide route guidance in response to a request received from the vehicle.

For example, based upon information stored in a mapping system of the remote facility 160, the remote facility may determine the conditions of various roads or portions thereof. Autonomous vehicles, such as the autonomous vehicle 110, may, in the course of determining a navigation route, receive instructions from the remote facility 160 regarding which roads or portions thereof, if any, are appropriate for use under certain circumstances, as described herein. Such instructions may be based in part on information received from the autonomous vehicle 110 or other autonomous vehicles regarding road conditions Accordingly, remote facility 160 may receive information regarding the roads/routes generally in real-time from one or more vehicles.

The autonomous vehicle 110 is preferably a fully autonomous automobile, but may additionally or alternatively be any semi-autonomous or fully autonomous vehicle; e.g., a boat, an unmanned aerial vehicle, a driverless car, etc. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

The autonomous vehicle 110 preferably includes a throttle interface that controls an engine throttle, motor speed (e.g., rotational speed of electric motor), or any other movement-enabling mechanism; a brake interface that controls brakes of the autonomous vehicle (or any other movement-retarding mechanism); and a steering interface that controls steering of the autonomous vehicle (e.g., by changing the angle of wheels of the autonomous vehicle). The autonomous vehicle 110 may additionally or alternatively include interfaces for control of any other vehicle functions; e.g., windshield wipers, headlights, turn indicators, air conditioning, etc.

Figure 2:
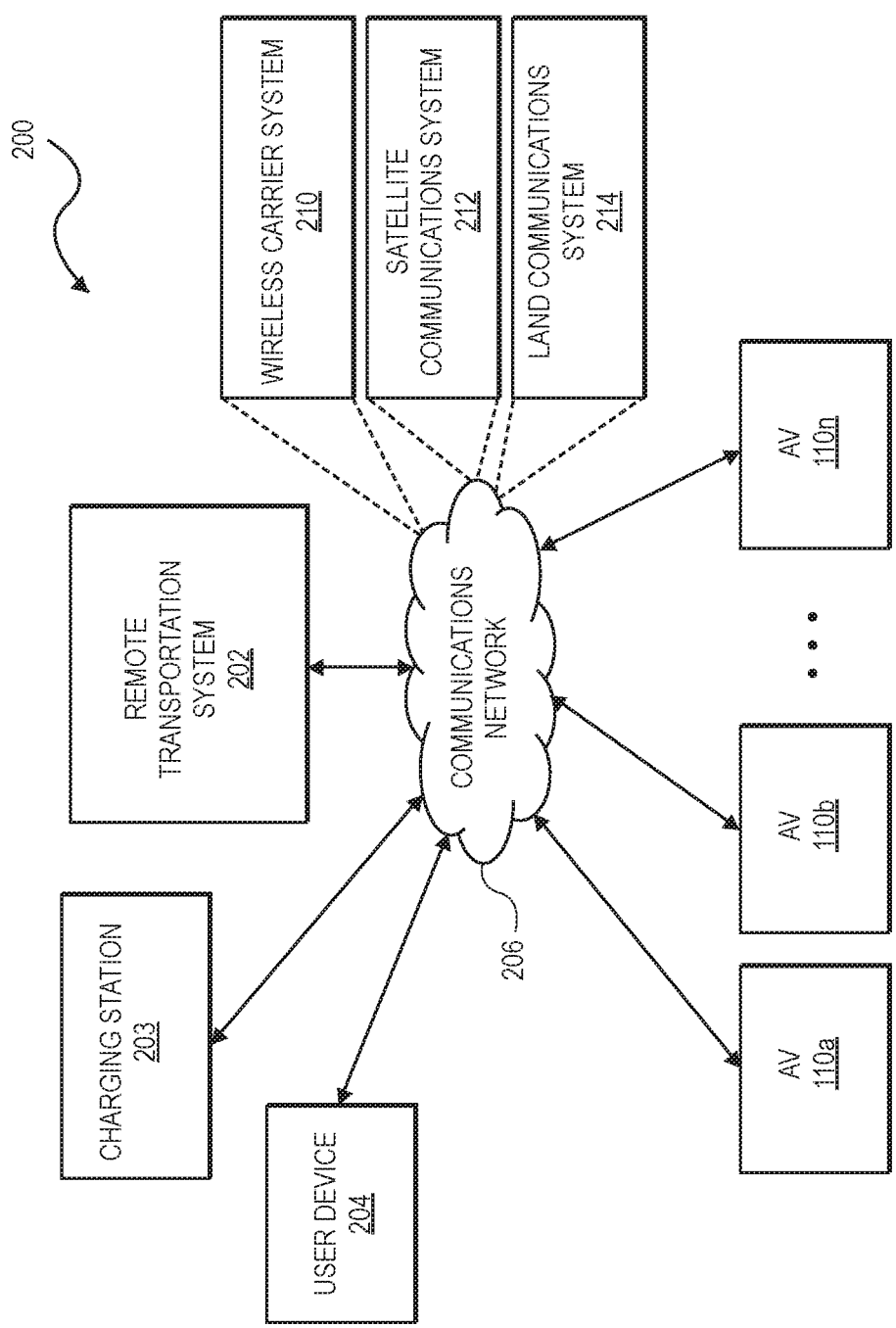
FIG. 2 is a functional block diagram illustrating a transportation system having one or more autonomous vehicles of FIG. 1 and at least one charging station, in accordance with various embodiments.

With reference now to FIG. 2, in various embodiments, the autonomous vehicle 110 described in connection with FIG. 1 may be suitable for use in the context of a taxi, shuttle, or delivery system in a certain geographical area (e.g., a city, a school or business campus, a shopping center, an amusement park, an event center, or the like) or may simply be managed by a remote system. For example, the autonomous vehicle 110 may be associated with an autonomous vehicle based remote transportation system. FIG. 2 illustrates an exemplary embodiment of an operating environment 200 that includes an autonomous vehicle based remote transportation system 202 associated with one or more autonomous vehicles 110a-110n as described with reference to FIG. 1. The operating environment 200 includes one or more charging stations, represented in FIG. 2 by a single charging station 203, that are accessible by the autonomous vehicles 110a-110n for autonomously charging the autonomous vehicles as described hereinbelow.

Figure 3:
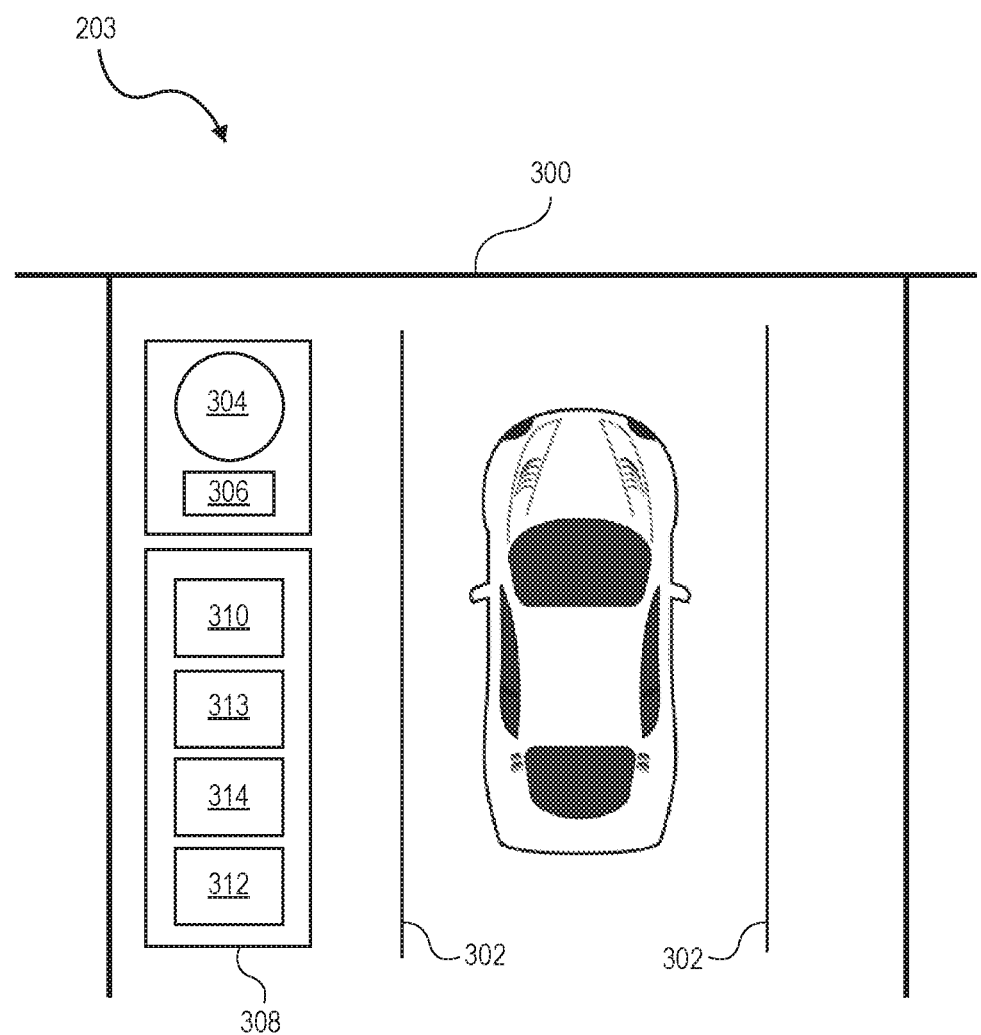
FIG. 3 is an illustration of a charging station, in accordance with various embodiments.

For example, as shown in more detail in FIG. 3, the exemplary charging station 203 includes one or more charging slots, represented in FIG. 3 by a single charging slot 300, each of which may optionally include positioning devices 302, such as a set of tracks or rails or other markings, for assisting in physically or visually guiding the autonomous vehicles 110a-110n into the charging slot. Each charging slot 300 further includes a power supply 304 associated with one more connector devices, represented in FIG. 3 by a single connector device 306. The one or more connector devices are coupleable to charge the RESS via a port of the vehicles 110a-110n, which port may be covered by a door. The power supply 304 provides, for example, high voltage direct current to the RESS when the connector device 306 is coupled to the port of a vehicle. In some embodiments, the connector device 306 may comprise a plug at the end of an extension cord.

Each charging slot 300 further includes a programmable machine 308 comprising a charging station side autonomous charging system. The programmable machine 308 includes a robotic extension arm 310 and transceiver module 312, which may be implemented using a separate transmitter and receiver or a single transceiver, for example. The extension arm 310 is autonomously controlled to interact with the vehicles 110a-110n and the power supply 304. For example, the extension arm 310 may include any number of links coupled by joints that allow for rotational motion and/or translational displacement of the arm. The extension arm 310 may further include an end effector having finger grippers for interacting with the vehicles 110a-110n and the connector device 306. As will be described in greater detail below, the transceiver module 312 may include a transmitter, receiver, and/or transceiver device capable of transmitting and/or receiving ultra-sonic, radio, visible light, and/or IR waves or signals, for example. Transceiver module 312 may be integrated into or otherwise connected to extension arm 310 at a known location and in a known configuration.

The programmable machine 308 may further include at least one processor 313 and a computer readable storage device or media 314. The processor 313 may be any custom made or commercially available processor, a central processing unit (CPU), a graphics processing unit (GPU), an auxiliary processor among several processors, a semiconductor based microprocessor (in the form of a microchip or chip set), a macroprocessor, any combination thereof, or generally any device for executing instructions. The computer readable storage device or media 314 may include volatile and nonvolatile storage in read-only memory (ROM), random-access memory (RAM), and keep-alive memory (KAM), for example. KAM is a persistent or nonvolatile memory that may be used to store various operating variables while the processor 313 is powered down. The computer-readable storage device or media 314 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the programmable machine 308 in controlling the extension arm 310. In various embodiments, the programmable machine 308 is configured to implement charging station systems and methods as discussed in detail below.

For example, the instructions may include one or more separate programs, each of which comprises an ordered listing of executable instructions for implementing logical functions. The instructions, when executed by the processor 313, communicate with the vehicles 110a-110n and/or the remote transportation system 202 (FIG. 2), generate control signals to control the extension arm 310, to control the transceiver module 312, and receive and process data from and/or generate and provide data to the transceiver module 312 associated with the extension arm 310.

Referring again to FIG. 2, in various embodiments, the operating environment 200 further includes one or more user devices, represented in FIG. 2 by a user device 204, that communicate with the autonomous vehicle 110 and/or the remote transportation system 202 via a communication network 206. The communication network 206 supports communication as needed between devices, systems, and components supported by the operating environment 200 (e.g., via tangible communication links and/or wireless communication links). For example, the communication network 206 may include a wireless carrier system 210, such as a cellular telephone system that includes a plurality of cell towers (not shown), one or more mobile switching centers (MSCs) (not shown), as well as any other networking components required to connect the wireless carrier system 210 with a land communications system. Each cell tower includes sending and receiving antennas and a base station, with the base stations from different cell towers being connected to the MSC either directly or via intermediary equipment such as a base station controller. The wireless carrier system 210 may implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 210. For example, the base station and cell tower may be co-located at the same site or be remotely located from one another, each base station may be responsible for a single cell tower or a single base station may service various cell towers, or various base stations may be coupled to a single MSC, to name but a few of the possible arrangements.

A second wireless carrier system in the form of a satellite communication system 212 may be provided to support uni-directional or bi-directional communication with the autonomous vehicles 110a-110n. The satellite communication system may include one or more communication satellites (not shown) and an uplink transmitting station (not shown). Uni-directional communication may include, for example, satellite radio services, wherein programming content (news, music, etc.) is received by the transmitting station, packaged for upload, and then sent to the satellite, which broadcasts the programming to subscribers. Bi-directional communication may include, for example, satellite telephony services using the satellite to relay telephone communications between the vehicle 110 and the station. The satellite system 212 may be utilized either in addition to or in lieu of the wireless carrier system 210.

A land communication system 214 comprising a conventional land-based telecommunications network connected to one or more landline telephones may further be included for connecting the wireless carrier system 210 to the remote transportation system 202. For example, the land communication system 214 may include a public switched telephone network (PSTN) such as that used to provide hardwired telephony, packet-switched data communications, and the Internet infrastructure. One or more segments of the land communication system 214 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 202 need not be connected via the land communication system 214, but may include wireless telephony equipment for communicating directly with a wireless network, such as the wireless carrier system 210.

Although only one user device 204 is shown in FIG. 2, embodiments of the operating environment 200 may support any number of user devices 204, including multiple user devices 204 owned, operated, or otherwise used by one person. Each user device 204 supported by the operating environment 200 may be implemented using any suitable hardware platform. In this regard, the user device 204 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 204 supported by the operating environment 200 is realized as a computer-implemented or computer-based device having the hardware, software, firmware, and/or processing logic needed to carry out the various techniques and methodologies described herein. For example, the user device 204 includes a microprocessor in the form of a programmable device that includes one or more instructions stored in an internal memory structure and applied to receive binary input to create binary output. In some embodiments, the user device 204 includes a GPS module capable of receiving GPS satellite signals and generating GPS coordinates based on those signals. In other embodiments, the user device 204 includes cellular communications functionality such that the device carries out voice and/or data communications over the communication network 206 using one or more cellular communications protocols, as are discussed herein. In various embodiments, the user device 204 includes a visual display, such as a touch-screen graphical display, or other display.

The remote transportation system 202 may include one or more backend server systems, which may be cloud-based, network-based, or resident at the particular campus or geographical location serviced by the remote transportation system 202. The remote transportation system 202 may be manned by a live advisor, or an autonomous advisor, or a combination of both. The remote transportation system 202 may communicate with the user devices 204 and the autonomous vehicles 110a-110n to schedule rides, dispatch autonomous vehicles 110a-110n, and the like. In various embodiments, the remote transportation system 202 may store account information, such as subscriber authentication information, vehicle identifiers, profile records, behavioral patterns, and other pertinent subscriber information.

As may be appreciated, the subject matter disclosed herein provides certain enhanced features and functionality to what may be considered as a standard or baseline autonomous vehicle and/or an autonomous vehicle based remote transportation system. To this end, an autonomous vehicle and autonomous vehicle based remote transportation system can be modified, enhanced, or otherwise supplemented to provide the additional features described in more detail below.

In accordance with various embodiments, the onboard computer 145 may implement an ADS 400; that is, suitable software and/or hardware components of the onboard computer 145 are utilized to provide an autonomous driving system 400 used in conjunction with vehicle 110.

Figure 4:
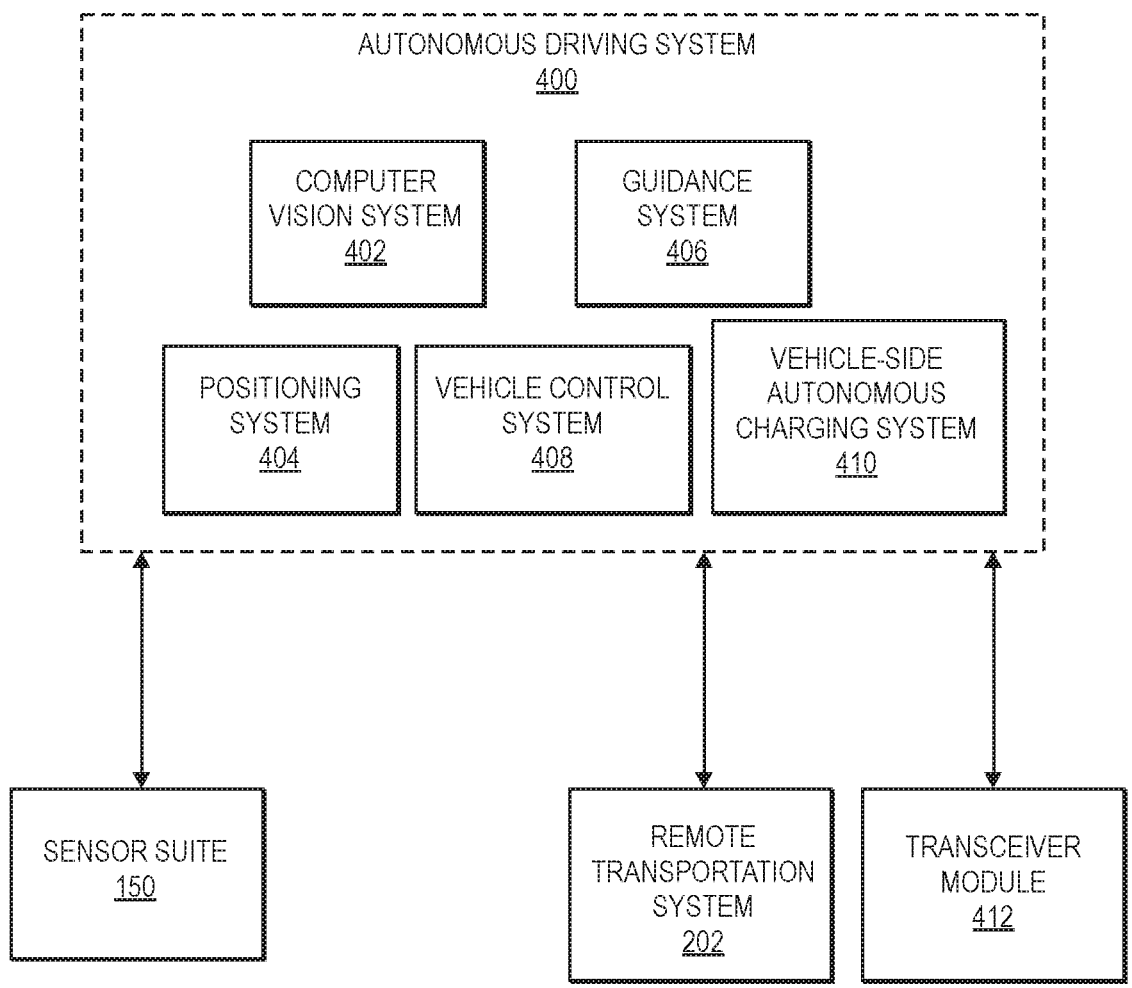
FIGS. 4 and 5 are block diagrams illustrating various aspects of a system for automated charging of an autonomous vehicle according to some embodiments of the present disclosure.

In various embodiments, the instructions of the ADS 400 may be organized by function, module, or system. For example, as shown in FIG. 4, the ADS 400 may include a CV system 402, a positioning system 404, a guidance system 406, and a vehicle control system 408. As may be appreciated, in various embodiments, the instructions may be organized into any number of systems (e.g., combined, further partitioned, etc.) and the disclosure is not limited to the cited examples.

In various embodiments, the CV system 402 may synthesize and process sensor data and predict the presence, location, classification, and/or path of objects and features of the environment of the vehicle 110. In various embodiments, the CV system 402 may incorporate information from multiple sensors, including but not limited to cameras, LIDAR, RADARS, and/or any number of other types of sensors.

The positioning system 404 may process sensor data along with other data to determine a position (e.g., a local position relative to a map, an exact position relative to lane of a road, vehicle heading, velocity, etc.) of the vehicle 110 relative to its environment. The guidance system 406 may process sensor data along with other data to determine a path for the vehicle 110 to follow. The vehicle control system 408 generates control signals for controlling the vehicle 110 according to the determined path.

In various embodiments, the onboard computer 145 may implement machine learning techniques to assist the functionality of the onboard computer, such as feature detection/classification, obstruction mitigation, route traversal, mapping, sensor integration, ground-truth determination, and the like.

A portion of the autonomous charging system disclosed herein is implemented within the ADS 400, for example, as a vehicle side autonomous charging system 410. In particular, the vehicle-side autonomous charging system 410 receives information from a vehicle-side transceiver module 412, which may include a transmitter, receiver, and/or transceiver device capable of transmitting and/or receiving ultra-sonic, radio, visible light, and/or IR waves or signals, for example. In accordance with features of embodiments described herein, the vehicle-side autonomous charging system 410 may generate control signals to control the transceiver module 412 and may receive and process data from and/or generate and provide data to transceiver module 412. In addition, in certain embodiments, the vehicle side autonomous charging system 410 may communicate with the remote transportation system 202 to locate a charging station, such as charging station 203, and communicates a location and/or a desired route to the guidance system 406 to initiate autonomous control of the vehicle 110. Once the vehicle 110 has navigated to the charging slot 300 of the selected charging station, the vehicle side autonomous charging system 410 may communicate with the charging station 203 to precisely position the autonomous vehicle within the charging slot 300 relative to the extension arm 310, to guide the extension arm 310 to the battery charging port, to couple the charging connector to the charging port, and to initiate and confirm charging of the RESS 155, as described in greater detail below.

Figure 5:
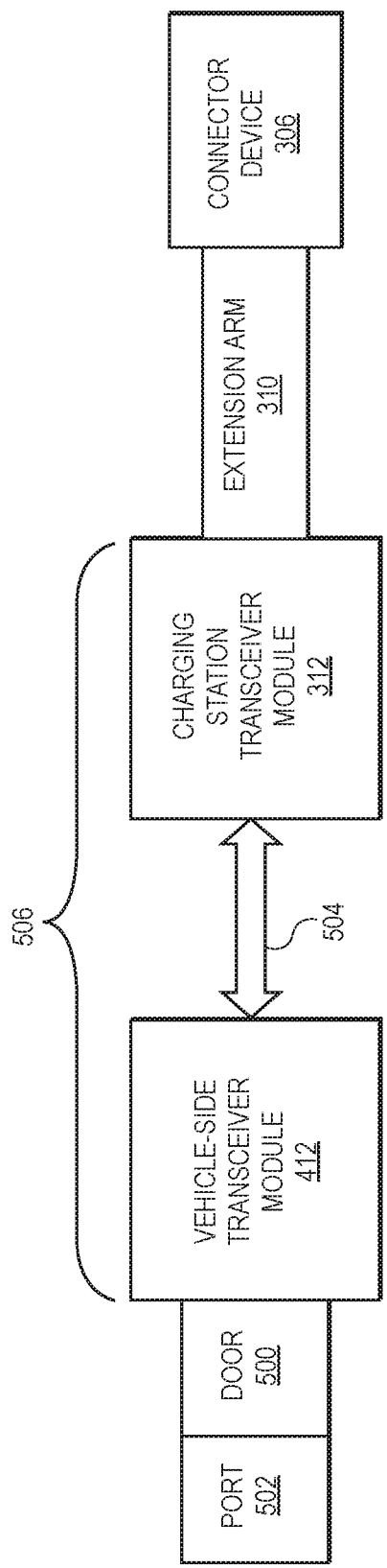

Referring now to FIG. 5, in accordance with features of embodiments described herein, transceiver module 412 (i.e., vehicle-side transceiver module) may be associated with and integrated into or disposed proximate a cover, or door, 500 covering a charging port 502, which charging port is provided to enable charging of RESS 155 of autonomous vehicle 110. In particular, signals emitted by the transceiver module are transmitted such that the emanate from a point (or area) comprising the charging port and/or port cover. Multiple transceiver modules may be provided for these services. Transceiver module 412 is configured such that it transmits signals to and/or receives signals from transceiver module 312 (i.e., charging station side transceiver module) associated with extension arm 310 carrying connector device 306 when the modules 412, 312, are within communications range of one another, as represented by a communications channel 504. Transceiver module 312 is associated with and/or integrated into the extension arm 210. Transceiver module 312 (including control systems thereof), transceiver module 412 (including control systems thereof), and communications channel 504 together comprise a communications system 506.

In one embodiment, communications system 506 may be implemented using principles of operation similar to those of an Instrument Landing System (ILS) for aircraft. An ILS is a system that operates by sending radio waves down range from a target or reference point (e.g., the end of a runway) with the aircraft that intercepts the radio waves using them to guide itself onto and along the runway. ILS provides the aircraft with horizontal and vertical guidance just before and during landing and, at certain fixed points, indicates the distance to the reference point of landing.

In a similar manner, the transceiver module 412 may function as the "target," while the transceiver module 312, in conjunction with the extension arm 310, may function as the aircraft, with the signals transmitted by the transceiver module 412 being used by the transceiver module 312 to guide the extension arm to the door 500 and, after opening the door, to the port 502. In certain embodiments, transceiver module 412 may include more than one transceiver module; for example, one associated with the door 500 and a second one associated with the port 502.

In an alternative embodiment, the transceiver 412 may be replaced by or supplemented with an antenna for reflecting signals transmitted by transceiver 312 such that transceiver 312 can locate the door 500/port 502 by detecting the signals reflected from the antenna. For example, the antenna may be implemented as a parabolic antenna, which focuses a beam signal into one point or directs a radiating signal into a beam, either of which may be detected by transceiver 312 to determine a location and an orientation of the port 502 and used to guide the extension arm 310 to connect the connector device 306 to the port.

In certain embodiments, the autonomous charging system 100 uses signals received by the transceiver module 312 from the transceiver module 412 to determine a location (i.e., "find") of the door 500/port 502 relative to the extension arm 310, which location information may be used by the ADS 400 to reposition the autonomous vehicle 110 (i.e., move the autonomous vehicle forward, back, to the left, and/or to the right) within the charging slot 300 to better enable the extension arm 310 to access the door 500. In this manner, the degree of freedom of rotation needed by the extension arm 310 (and therefore the complexity and potentially the cost thereof) may be reduced.

Once the extension arm 310 locates the door 500, as indicated above and described in greater detail below, control signals are generated to the extension arm 310 (e.g., from the programmable machine 308) to cause the extension arm 310 to open the door. Once the door 500 is open, control signals are generated to the extension arm 310 (e.g., from the programmable machine 308) to cause the extension arm 310 to connect the connector device 306 via the charging port 502. As previously noted, this process may be facilitated by the same or a different transceiver module. Such a non-vision based signaling system described herein system may provide advantages over a vision-based system in situations in which visibility is low or in which the lens of a vision-based system is somehow impaired (e.g., by dust or dirt that may occlude the lens). Additionally, dust or dirt, for example, may camouflage the door or port cover such that a vision-based system may not be able to identify the door or port cover and therefore be unable to locate same.

As may be appreciated, various embodiments of the autonomous charging system 100 according to the present disclosure may include any number of modules and sub-modules embedded within the onboard computer 145, which may be combined and/or further partitioned to similarly implement systems and methods described herein. Furthermore, inputs to the autonomous charging system 100 may be received from the transceiver module 412, received from other control modules (not shown) associated with the autonomous vehicle 110, received via the communication system 506, and/or determined/modeled by other modules or sub-modules within the onboard computer 145 of FIG. 1. Furthermore, the inputs might also be subjected to preprocessing, such as sub-sampling, noise-reduction, normalization, feature-extraction, missing data reduction, and the like.

Figure 6:
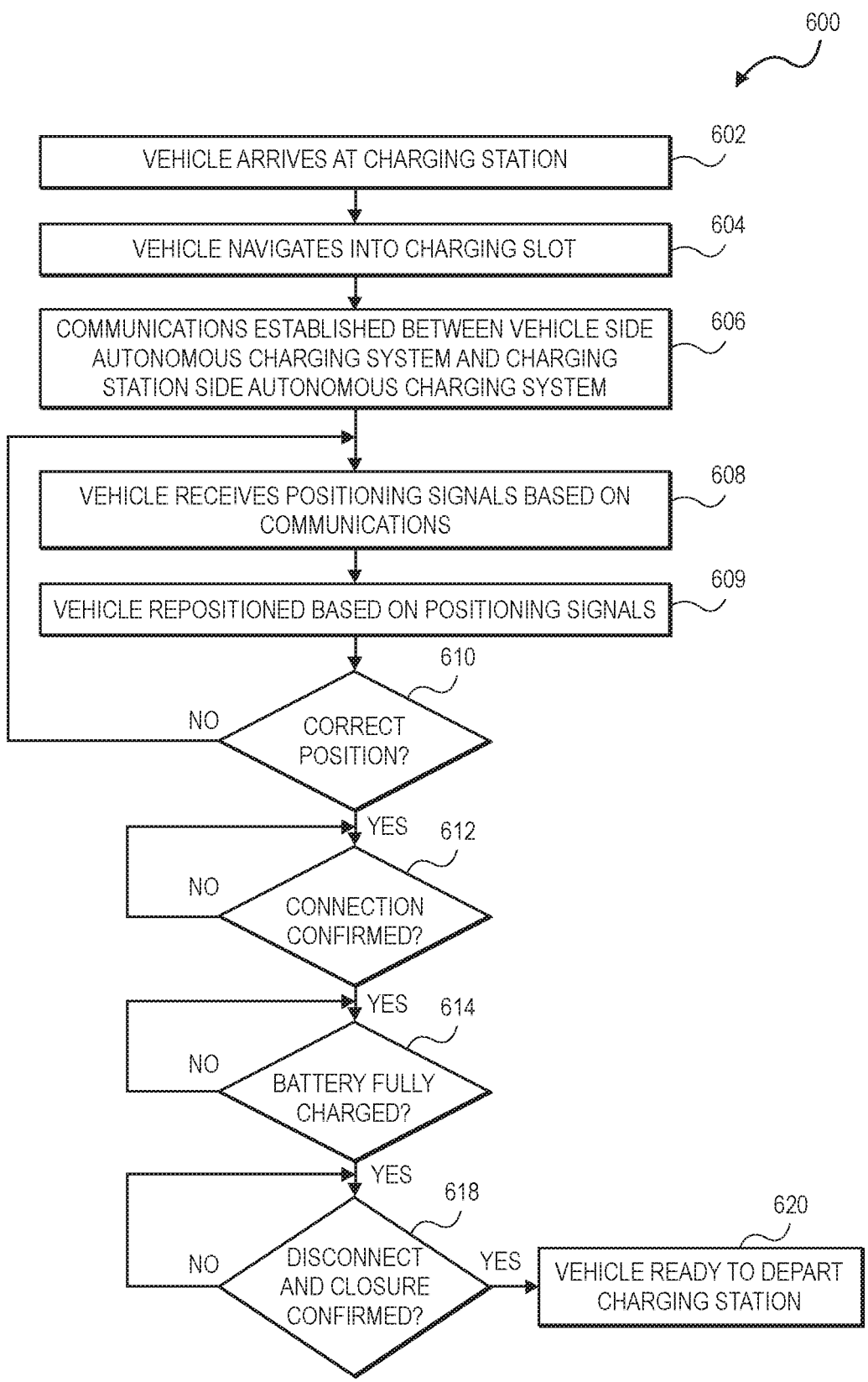
FIGS. 6 and 7 are flowcharts illustrating control methods for controlling various aspects of a system for automated charging of an autonomous vehicle according to some embodiments of the present disclosure.
Figure 7:
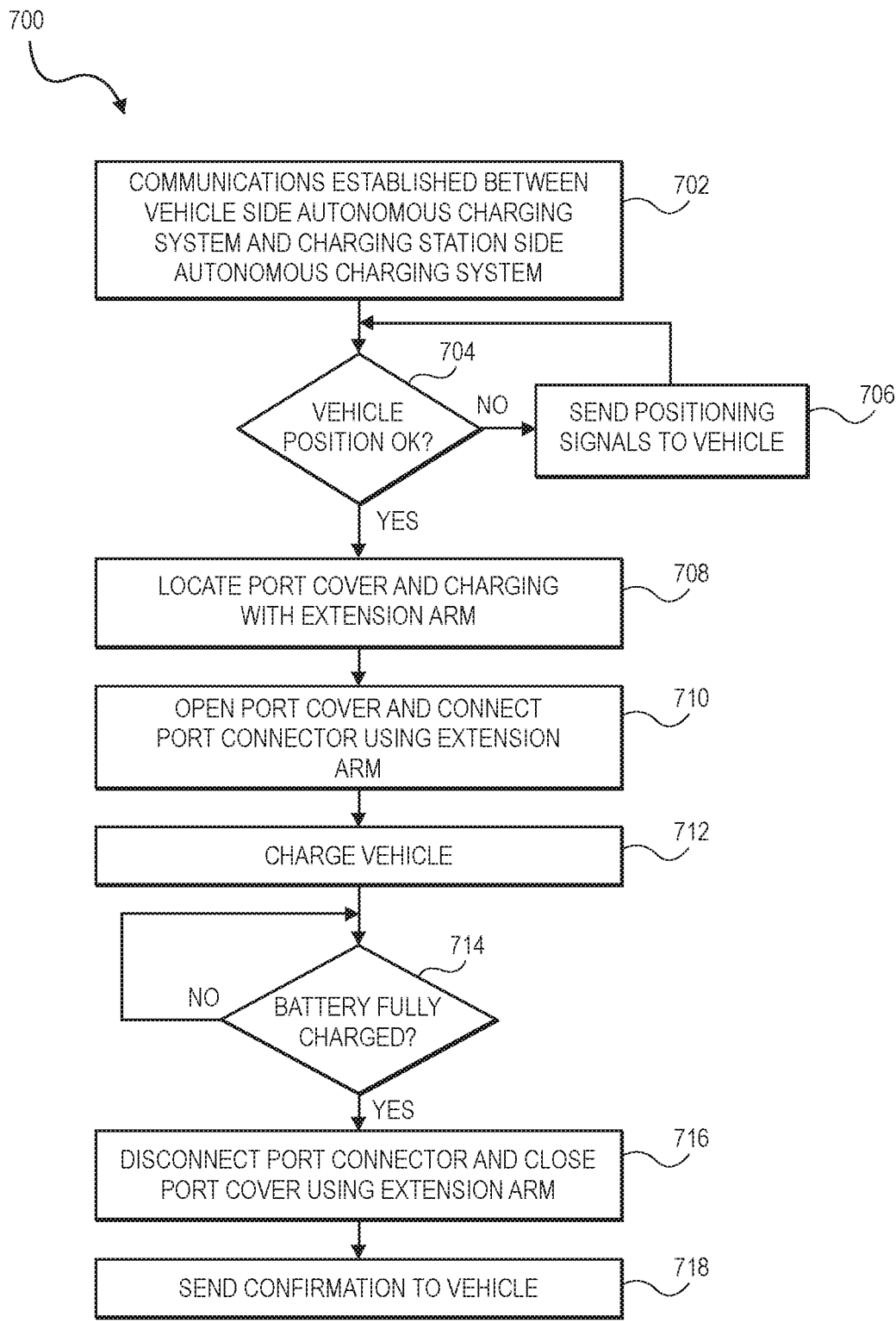

Referring now to FIGS. 6 and 7, and with continued reference to FIGS. 1-5, flowcharts shown therein illustrate control methods 600 and 700 that may be performed by the autonomous charging system 100 in accordance with the present disclosure. As can be appreciated in light of the disclosure, the order of operation within the methods is not limited to the sequential execution as illustrated in FIGS. 6 and 7, but may be performed in one or more varying orders as applicable and in accordance with the present disclosure. In various embodiments, the methods 600 and 700 may be scheduled to run based on one or more predetermined events, and/or can run continuously during operation of the autonomous vehicle 110.

In various embodiments, the method 600 may be performed by the vehicle 110 (e.g., the vehicle side autonomous charging system) and the method 700 may be performed by the charging station system (FIG. 3) (e.g., by the charging station side autonomous charging system). Referring now to FIG. 6, the method 600 begins at step 602, when a vehicle (e.g., vehicle 110) arrives at a charging station (e.g., charging station 203). It will be recognized that the vehicle's arrival at the charging station may be prompted and/or preceded by any number of steps, which may include autonomous detection that the level of charge of the vehicle's battery is below a certain threshold value, autonomous selection of a charging station for charging the vehicle's battery, autonomous reserving of a time slot at the selected charging station, and/or autonomous navigation to the charging station.

In step 604, the vehicle is generally navigated between the positioning devices (e.g., poisoning devices 302) defining a charging slot (e.g., charging slot 300) of the charging station.

In step 606, communications between the vehicle side autonomous charging system and the charging station side autonomous charging system are established, as described with reference to FIG. 5. For example, in one non-limiting example embodiment, the vehicle side autonomous charging system may begin to transmit signals upon arrival at the charging station, which signals may be detected by the charging station side autonomous charging system. In another non-limiting example embodiment, the charging station side autonomous charging system may begin transmitting signals upon the arrival of the vehicle at the charging station, which signals may be reflected back to the charging station side autonomous charging system by an antenna included as part of the vehicle side autonomous charging system.

In step 608, positioning signals are received are received from the charging station side autonomous charging system based on conditions of the established connection.

In step 609, the vehicle repositions itself based on the received positioning signals.

In step 610, a determination is made whether the vehicle is in the proper position with respect to the charging station. If a negative determination is made in step 610, execution returns to step 608. Once a positive determination is made in step 610, execution proceeds to step 612.

In step 612, the vehicle awaits confirmation from the charging station that the charging port cover has been opened and a connector device of the charging station (e.g., connector device 306) has been connected to the port, at which point charging of the battery is initiated.

In step 614, the charge level of the battery is compared to a maximum charge threshold. Once the charge level of the battery is equal to the maximum charge threshold, execution proceeds to step 616.

In step 616, the vehicle communicates to the charging station to cease charging the vehicle.

In step 618, the vehicle awaits confirmation that from the charging station that the connector device has been disconnected from the port and the charging port cover has been closed.

In step 620, the vehicle prepares to depart the charging station.

Referring now to FIG. 7, the method 700 begins at step 702 in response to establishment of communications between the vehicle side autonomous charging system and the charging station side autonomous charging system.

In step 704, signals received from the vehicle side autonomous charging system are processed to determine whether a position of the port cover and/or charging port relative to an extension arm of the charging station is acceptable. If a negative determination is made in step 704, execution proceeds to step 706; otherwise, execution proceeds to step 708.

In step 706, positioning signals are provided to the vehicle to cause the vehicle to adjust its position.

In step 708, signals received from the vehicle side autonomous charging system are used to locate the port cover and charging port with the extension arm.

In step 710, the extension arm opens the port cover and connects the charging connector to the port.

In step 712, the charging station initiates charging.

In step 714, a determination is made whether the vehicle has instructed the charging station to cease charging the vehicle. Execution remains at step 714 until a positive determination is made, at which point execution proceeds to step 716.

In step 716, the charging connector is disconnected from the charging port and then port cover is closed.

In step 718, the charging station communicates a confirmation to the vehicle that the connector device has been disconnected from the port and the charging port cover has been closed.

As may be appreciated, in any instance in which the methods 600 and 700 await receipt of a communication and that communication is not received within a defined time period, follow-up requests for information may generated in various embodiments.

Figure 8:
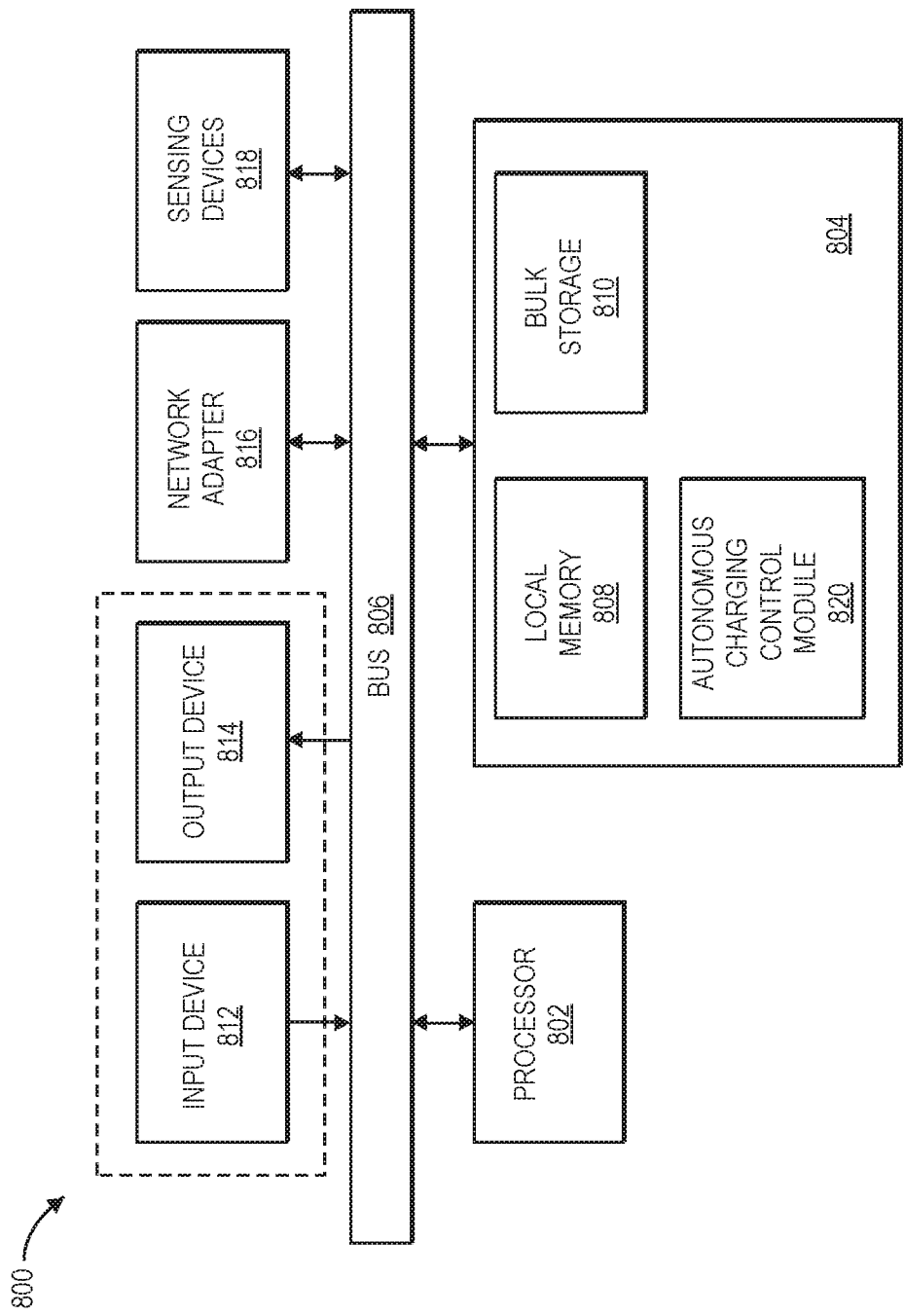
FIG. 8 is a block diagram illustrating a system for automated charging of an autonomous vehicle according to some embodiments of the present disclosure.

FIG. 8 is a block diagram illustrating an example system 800 that may be configured to implement at least portions of a system for automated charging of an autonomous vehicle, such as the autonomous vehicle 110, in accordance with embodiments described herein, and more particularly as shown in the FIGURES described hereinabove. Part or all of the system 800 may be implemented as a sensor suite, such as the sensor suite 150, and/or an onboard computer, such as onboard computer 145, and/or a remote system, such as remote facility 160. As shown in FIG. 8, the system 800 may include at least one processor 802, e.g. a hardware processor 802, coupled to memory elements 804 through a system bus 806. As such, the system may store program code and/or data within memory elements 804. Further, the processor 802 may execute the program code accessed from the memory elements 804 via a system bus 806. In one aspect, the system may be implemented as a computer that is suitable for storing and/or executing program code (e.g., onboard computer 145). It should be appreciated, however, that the system 800 may be implemented in the form of any system including a processor and a memory that is capable of performing the functions described in this disclosure.

In some embodiments, the processor 802 can execute software or an algorithm to perform the activities as discussed in this specification; in particular, activities related to an automated charging system for an autonomous vehicle in accordance with embodiments described herein. The processor 802 may include any combination of hardware, software, or firmware providing programmable logic, including by way of non-limiting example a microprocessor, a Digital Signal Processor (DSP), a field-programmable gate array (FPGA), a programmable logic array (PLA), an integrated circuit (IC), an application specific IC (ASIC), or a virtual machine processor. The processor 802 may be communicatively coupled to the memory element 804, for example in a direct-memory access (DMA) configuration, so that the processor 802 may read from or write to the memory elements 804.

In general, the memory elements 804 may include any suitable volatile or nonvolatile memory technology, including double data rate (DDR) random access memory (RAM), synchronous RAM (SRAM), dynamic RAM (DRAM), flash, read-only memory (ROM), optical media, virtual memory regions, magnetic or tape memory, or any other suitable technology. Unless specified otherwise, any of the memory elements discussed herein should be construed as being encompassed within the broad term "memory." The information being measured, processed, tracked or sent to or from any of the components of the system 800 could be provided in any database, register, control list, cache, or storage structure, all of which can be referenced at any suitable timeframe. Any such storage options may be included within the broad term "memory" as used herein. Similarly, any of the potential processing elements, modules, and machines described herein should be construed as being encompassed within the broad term "processor." Each of the elements shown in the present figures may also include suitable interfaces for receiving, transmitting, and/or otherwise communicating data or information in a network environment so that they can communicate with, for example, a system having hardware similar or identical to another one of these elements.

In certain example implementations, mechanisms for implementing an automated charging system for an autonomous vehicle as outlined herein may be implemented by logic encoded in one or more tangible media, which may be inclusive of non-transitory media, e.g., embedded logic provided in an ASIC, in DSP instructions, software (potentially inclusive of object code and source code) to be executed by a processor, or other similar machine, etc. In some of these instances, memory elements, such as e.g. the memory elements 804 shown in FIG. 8, can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors, such as e.g. the processor 802 shown in FIG. 8, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, a DSP, an erasable programmable read-only memory (EPROM), an electrically erasable programmable read-only memory (EEPROM)) or an ASIC that includes digital logic, software, code, electronic instructions, or any suitable combination thereof.

The memory elements 804 may include one or more physical memory devices such as, for example, local memory 808 and one or more bulk storage devices 810. The local memory may refer to RAM or other non-persistent memory device(s) generally used during actual execution of the program code. A bulk storage device may be implemented as a hard drive or other persistent data storage device. The processing system 800 may also include one or more cache memories (not shown) that provide temporary storage of at least some program code in order to reduce the number of times program code must be retrieved from the bulk storage device 810 during execution.

As shown in FIG. 8, the memory elements 804 may store an autonomous charging control module 820, which in various embodiments may correspond to portions of vehicle side autonomous charging system 410 (FIG. 4) and/or charging station side autonomous charging system 308 (FIG. 3). In various embodiments, the module 820, may be stored in the local memory 808, the one or more bulk storage devices 810, or apart from the local memory and the bulk storage devices. It should be appreciated that the system 800 may further execute an operating system (not shown in FIG. 8) that can facilitate execution of the module 820. The module 820, being implemented in the form of executable program code and/or data, can be read from, written to, and/or executed by the system 800, e.g., by the processor 802. Responsive to reading from, writing to, and/or executing one of the modules 820, the system 800 may be configured to perform one or more operations or method steps described herein.

Examples of input devices may include, but are not limited to, a receiver, a transceiver, a keyboard, a pointing device such as a mouse, or the like. Examples of output devices may include, but are not limited to, a transmitter, a transceiver, an antenna, a monitor or a display, speakers, or the like. In some implementations, the system may include a device driver (not shown) for the output device 814. Input and/or output devices 812, 814 may be coupled to the system 800 either directly or through intervening I/O controllers. Additionally, sensing devices 815, may be coupled to the system 800. Examples of sensing devices 815 may include, but are not limited to, cameras (located inside and/or outside the vehicle), LIDARs, RADARS, scales, QR code readers, bar code readers, RF sensors, and others. Sensing devices 815 may be coupled to the system 800 either directly or through intervening controllers and/or drivers.

Cameras may be implemented using high-resolution imagers with fixed mounting and field of view. LIDARs may be implemented using scanning LIDARs with dynamically configurable field of view that provides a point-cloud of the region intended to scan. RADARs may be implemented using scanning RADARs with dynamically configurable field of view.

In an embodiment, the input and the output devices may be implemented as a combined input/output device (illustrated in FIG. 8 with a dashed line surrounding the input device 812 and the output device 814). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 816 may also, optionally, be coupled to the system 800 to enable it to become coupled to other systems, computer systems, remote network devices, and/or remote storage devices through intervening private or public networks. The network adapter may comprise a data receiver for receiving data that is transmitted by said systems, devices and/or networks to the system 800, and a data transmitter for transmitting data from the system 800 to said systems, devices and/or networks. Modems, cable modems, and Ethernet cards are examples of different types of network adapter that may be used with the system 800.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the FIGS. may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the FIGS. may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the digital filters may be implemented in one or more silicon cores in Application Specific Integrated Circuits (ASICs), Field-Programmable Gate Arrays (FPGAs), and other semiconductor chips.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGS. and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is also important to note that the functions related to contactless current measurement using magnetic sensors, e.g. those summarized in the one or more processes shown in FIGS., illustrate only some of the possible functions that may be executed by, or within, the current measurement systems illustrated in the FIGS. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the apparatus described above may also be implemented with respect to the method or process described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A method comprising:
    subsequent to arrival of a vehicle at a charging station, establishing communications between a vehicle side autonomous charging system associated with the vehicle and a charging station side autonomous charging system associated with the charging station;
    receiving by the charging station side autonomous charging system at least one signal from the vehicle side autonomous charging system, wherein the at least one signal is indicative of a location of a charging port of the vehicle;
    generating positioning signals based on the received at least one signal indicative of the location of the charging port;
    providing the positioning signals to an autonomous driving system (ADS) implemented by an onboard computer installed in the vehicle for use by the autonomous driving system (ADS) to reposition the vehicle within a slot of the charging station; and
    using the received at least one signal to guide a robotic extension arm of the charging station to a location proximate the vehicle charging port,
    wherein the at least one signal comprises a signal of an instrument landing system (ILS) type of guidance system, in which the charging port comprises a target of the ILS.

2. The method of claim 1 further comprising:
    transmitting from the charging station side autonomous charging system at least one locator signal; and
    reflecting by the vehicle side autonomous charging system the transmitted at least one locator signal;
    wherein the at least one signal indicative of a location of the charging port of the vehicle comprises the reflected at least one location signal.

3. The method of claim 2, wherein the transmitting is performed by a transmitter associated with the robotic extension arm and the reflecting is performed by a parabolic reflector associated with the charging port.

4. The method of claim 1 further comprising:
    transmitting from the vehicle side autonomous charging system at least one locator signal; and
    receiving by the charging station side autonomous charging system the transmitted at least one locator signal;
    wherein the at least one signal indicative of a location of the charging port of the vehicle comprises the received at least one location signal.

5. The method of claim 4, wherein the transmitting is performed by a transmitter associated with the charging port and the receiving is performed by a receiver associated with the robotic extension arm.

6. The method of claim 1 further comprising using the robotic extension arm to open a door covering the charging port and to couple a connector device to the charging port to enabling charging of a battery of the vehicle.

7. The method of claim 6 further comprising monitoring a state of charge of the battery during charging of the battery.

8. The method of claim 1, wherein the at least one signal comprises at least one of an ultra-sonic signal, a radio signal, a visible light signal and an infrared ("IR") signal.

9. The method of claim 1, further comprising receiving by the charging station side autonomous charging system at least one second signal from the vehicle side autonomous charging system, wherein the at least one second signal is indicative of a location of a door covering the charging port of the vehicle.

10. A system for autonomously charging a vehicle at a charging station, the system comprising:
    a vehicle side module associated with a charging port of the vehicle; and
    a charging station side module associated with a robotic extension arm of the charging station and comprising electronics for receiving signals from the vehicle side module indicative of a location of the charging port;
    wherein the received signals are used by the charging station side module to generate positioning signals based on the received signals, the positioning signals being used by an autonomous driving system (ADS)

implemented by an onboard computer installed in the vehicle to reposition the vehicle within a slot of the charging station;

wherein the received signals are used by the charging station side module to guide the robotic extension arm to the charging port; and wherein the received signal comprises a signal of an instrument landing system (ILS) type of guidance system, in which the charging port comprises a target of the ILS, the received signal comprising a plurality of signals for providing continuous horizontal, vertical, and distance guidance for the robotic extension arm to the charging port.

11. The system of claim 10, wherein the charging station side module comprises a transmitter device for transmitting locator signals and wherein the vehicle side module comprises a reflector for reflecting the transmitted locator signals.

12. The system of claim 11, wherein the charging station side module further comprises a receiver device for receiving the reflected locator signals, the reflected locator signals comprising the signals indicative of a location of the charging port.

13. The system of claim 12, wherein the transmitter device and the receiver device are collectively implemented as a transceiver device.

14. The system of claim 10, wherein the vehicle side module comprises a transmitter device for transmitting locator signals and the charging station side module comprises a receiver device for receiving the transmitted locator signals, the received locator signals comprising the signals indicative of a location of the charging port.

15. The system of claim 10, wherein the vehicle side module is integrated with the charging port.

16. The system of claim 10, wherein the charging station side module is integrated with the robotic extension arm.

17. The system of claim 10, wherein the ADS further comprises at least one of a computer vision system, and a guidance system.

18. The system of claim 10, wherein the charging station side module further comprises electronics for receiving second signals from the vehicle side module, the second signals indicative of a location of a door covering the charging port.

19. A charging station comprising:

a robotic extension arm carrying a charging connector connected to a power source by an extension cord;

a charging slot for receiving a vehicle having a battery, wherein the charging connector is coupled to a charging port of the vehicle to charge the battery; and a charging station side module associated with the robotic extension arm for receiving signals from a vehicle side module associated with the charging port, the received signals being used to generate positioning signals to the vehicle based on the received signals, wherein the positioning signals are used by an autonomous driving system (ADS) implemented by an onboard computer installed in the vehicle to reposition the vehicle within a slot of the charging station, and to guide the robotic extension arm to a location of the charging port, the robotic extension arm for exposing the charging port and coupling the charging connector thereto;

wherein the received signal comprises a signal of an instrument landing system (ILS) type of guidance system, in which the charging port comprises a target of the ILS, the received signal comprising a plurality of signals for providing continuous horizontal, vertical, and distance guidance for the robotic extension arm to the charging port, and wherein the vehicle side module comprises a first transmitter device for transmitting first locator signals indicative of a location of the charging port and a second transmitter device for transmitting second locator signals indicative of a location of a door covering the charging port and the charging station side module comprises a receiver device for receiving the transmitted first and second locator signals.

\* \* \* \* \*